US012783754B2

(12) United States Patent
Ikeda et al.

(10) Patent No.: US 12,783,754 B2
(45) Date of Patent: Nov. 3, 2026

(54) SYSTEM AND DESIGN METHOD

(71) Applicant: SHIMIZU CORPORATION, Tokyo (JP)

(72) Inventors: Ryosuke Ikeda, Tokyo (JP); Yasuo Nitta, Tokyo (JP); Yuho Kawamoto, Tokyo (JP); Takaaki Tsukada, Tokyo (JP); Yoshiki Tanaka, Tokyo (JP); Kosei Yachi, Tokyo (JP); Satoko Goto, Tokyo (JP); Masamu Matsumoto, Tokyo (JP)

(73) Assignee: SHIMIZU CORPORATION, Tokyo (JP)

( * ) Notice: Subject to any disclaimer, the term of this patent is extended or adjusted under 35 U.S.C. 154(b) by 1039 days.

(21) Appl. No.: 17/699,267

(22) Filed: Mar. 21, 2022

(65) Prior Publication Data

US 2022/0207214 A1 Jun. 30, 2022

Related U.S. Application Data

(63) Continuation of application No. PCT/JP2020/023511, filed on Jun. 16, 2020.

(30) Foreign Application Priority Data

Sep. 27, 2019 (JP) ................................ 2019-177125
Sep. 27, 2019 (JP) ................................ 2019-177126

(51) Int. Cl.
*G06F 30/23* (2020.01)
*G06F 30/20* (2020.01)
*G06F 111/10* (2020.01)

(52) U.S. Cl.
CPC .............. *G06F 30/23* (2020.01); *G06F 30/20* (2020.01); *G06F 2111/10* (2020.01)

(58) Field of Classification Search
CPC ...... G06F 30/23; G06F 30/20; G06F 2111/10; G06F 2119/14; G06F 30/13; G01M 7/02; G01N 3/00
See application file for complete search history.

(56) References Cited

U.S. PATENT DOCUMENTS

2003/0025650 A1 2/2003 Uesaki et al.

FOREIGN PATENT DOCUMENTS

JP H11-352005 A 12/1999
JP 2002-358541 A 12/2002
(Continued)

OTHER PUBLICATIONS

Yetkin, Musa, et al. "Nonlinear seismic behavior of a historical dam for different soil groups." Sigma Journal of Engineering and Natural Sciences 36.4 (2018): 1009-1022. (Year: 2018).*
(Continued)

*Primary Examiner* — Michael Edward Cocchi
(74) *Attorney, Agent, or Firm* — METROLEX IP LAW GROUP, PLLC; Robert L. Scott, Esq.

(57) ABSTRACT

A design system that assists in a design of a structure to be designed by using a three-dimensional finite element method, includes: a calculation unit that performs three-dimensional analysis of a component of a stress acting on the structure with respect to earthquake input based on design data related to a configuration of and load on the structure, calculates a history indicating a relationship between stresses of two or more components acting on the structure, sets a design stress space so as to envelop a region containing the history in a convex shape, and calculates a first design stress acting on a cross section of the structure based on the design stress space.

3 Claims, 6 Drawing Sheets

(56) References Cited

FOREIGN PATENT DOCUMENTS

| | | | | |
|---|---|---|---|---|
| JP | 2006-170919 | A | | 6/2006 |
| JP | 2011107040 | A | * | 6/2011 |

OTHER PUBLICATIONS

Sfakianakis, M. G., and M. N. Fardis. "Nonlinear finite element for modeling reinforced concrete columns in three-dimensional dynamic analysis." Computers & structures 40.6 (1991): 1405-1419. (Year: 1991).*

Sfakianakis, M. G. "Biaxial bending with axial force of reinforced, composite and repaired concrete sections of arbitrary shape by fiber model and computer graphics." Advances in engineering software 33.4 (2002): 227-242. (Year: 2002).*

Cho, Yigil, et al. "Study of architectural responses of 3D periodic cellular materials." Modelling and Simulation in Materials Science and Engineering 21.6 (2013): 065018. (Year: 2013).*

Barber, C. Bradford, David P. Dobkin, and Hannu Huhdanpaa. "The quickhull algorithm for convex hulls." ACM Transactions on Mathematical Software (TOMS) 22.4 (1996): 469-483. (Year: 1996).*

International Search Report ("ISR") of PCT/JP2020/023511 mailed on Jul. 21, 2020.

Office Action (CAOA) issued on Jan. 24, 2023 in a corresponding Canadian patent application.

* cited by examiner

SYSTEM AND DESIGN METHOD

CROSS-REFERENCE TO RELATED APPLICATIONS

This application is a continuation application based on a PCT Patent Application No. PCT/JP2020/023511, filed on Jun. 16, 2020, priority of which is claimed on Japanese Patent Applications No. 2019-177125 and No. 2019-177126, filed on Sep. 27, 2019. The contents of both the PCT Application and the Japanese Applications are incorporated herein by reference.

BACKGROUND

Technical Field

The present invention relates to a design system and a design method that performs stress calculation for designing a structure.

Background Art

In designing structures such as oversea nuclear power plants, designs are being made using elemental stresses directly obtained from earthquake response analysis (dynamic solution) using the three-dimensional finite element method (3D-FEM: Finite Element Method) and member stresses composed of multiple elements (see, for example, Japanese Unexamined Patent Application, First Publication No. 2011-107040).

When stress time history data is calculated by analysis using 3D-FEM, the amount of output data is enormous, so if the cross section of the structure is calculated at all times, the calculation time will be enormous. Therefore, stress data that is critical in design is extracted, and designing is performed based on the extracted stress data.

SUMMARY

However, when designing using the maximum value of the stress regardless of the time based on the analysis result using 3D-FEM, there is a problem, for example, in that it will be a conservative design in which the maximum value of the axial force and the maximum value of the bending moment are generated at the same time.

The present invention has been made in view of the above-mentioned problems, and an object thereof is to provide a design system and a design method capable of performing rational design while easily extracting necessary data from a huge amount of stress acting on a structure.

In order to achieve the above object, the present invention is a design system that assists in a design of a structure to be designed by using a three-dimensional finite element method, the design system including a calculation unit that performs three-dimensional analysis of a component of a stress acting on the structure with respect to earthquake input based on design data related to a configuration of and load on the structure, calculates a history indicating a relationship between stresses of two or more components acting on the structure, sets a design stress space so as to envelop a region containing the history in a convex shape, and calculates a first design stress acting on a cross section of the structure based on the design stress space.

According to the present invention, in the analysis using the three-dimensional finite element method of the dynamic stress acting on the cross section of the structure due to the earthquake input, by setting the design stress space that envelops all the analysis results, it is possible to rationally extract stress data that is critical to the design and significantly reduce the number of data used in the design.

In addition, the present invention may be configured such that, based on the design data, the calculation unit performs three-dimensional analysis of the component of the stress acting on the structure with respect to a static load including a fixed load and calculates a second design stress acting on the cross section of the structure, and based on the first design stress and the second design stress, the calculation unit calculates a stress acting on the cross section of the structure.

According to the present invention, by performing analysis by a three-dimensional finite element method of the stress acting on a cross section of a structure due to a fixed load or the like, it is possible to calculate the cross section of the structure based on the stress obtained by combining a first design stress and a second design stress.

A design method that assists in a design of a structure to be designed by using a three-dimensional finite element method, the design method including: performing three-dimensional analysis of a component of a stress acting on the structure with respect to earthquake input based on design data related to a configuration of and load on the structure; calculating a history indicating a relationship between stresses of two or more components acting on the structure; setting a design stress space so as to envelop a region containing the history in a convex shape; and calculating a first design stress acting on a cross section of the structure based on the design stress space.

According to the present invention, in the analysis using the three-dimensional finite element method of the dynamic stress acting on the cross section of the structure due to the earthquake input, by setting the design stress space that envelops all the analysis results, it is possible to rationally extract stress data that is critical to the design and significantly reduce the number of data used in the design.

According to the present invention, it is possible to perform a rational design while easily extracting necessary data from a huge amount of stress acting on a structure.

DETAILED DESCRIPTION OF THE PREFERRED EMBODIMENTS

Hereinafter, an embodiment of a design system 1 according to the present invention will be described with reference to the drawings. The design system 1 is a design assist device that analyzes a stress acting on a cross section of a building due to earthquake force by using a three-dimensional finite element method (3D-FEM).

Figure 1:
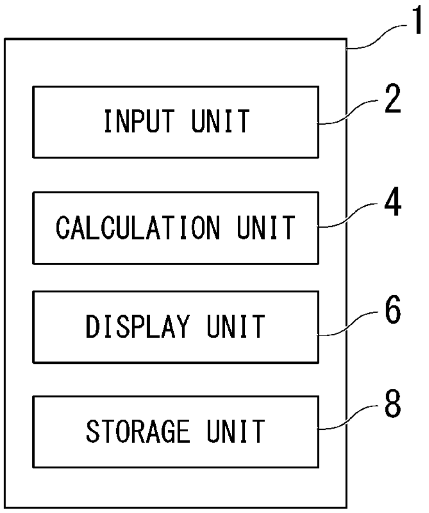
FIG. 1 is a block diagram showing a configuration of a design system according to an embodiment of the present invention.

As shown in FIG. 1, the design system 1 displays an input unit 2 in which design data is input, a calculation unit 4 that calculates a design value based on the input data, a display unit 6 that displays a calculation result of the calculation unit 4, and a storage unit 8 that stores data necessary for the calculation of the calculation unit 4.

The design system 1 is realized by, for example, a terminal device such as a personal computer, a tablet terminal, or a smartphone. The design system 1 may be a server device that outputs a calculation result through a network.

The input unit 2 is a user interface for data input realized by a keyboard, a touch panel, or the like. The input unit 2 may be a separate terminal device connected wirelessly, by wire, or the like by a tablet terminal or a smartphone. From the input unit 2, design data related to the design such as the configuration of and load on the building to be designed is input. The input design data is stored in the storage unit 8. The design data includes, for example, various data such as the dimensions of the design object, the floor plan, the weight of the member, the material, the waveform of the earthquake wave, and the fixed load such as the wind load.

The storage unit 8 is a storage device composed of a storage medium such as a flash memory or an HDD (Hard Disk Drive). The storage unit 8 stores, in addition to the design data input by the input unit 2, data such as a program that executes a mathematical formula necessary for 3D-FEM analysis. The storage unit 8 is built in the design system 1. The storage unit 8 may be a storage device that can be attached to and detached from the design system 1, or may be built in a server device connected via a network.

The calculation unit 4 executes calculations such as 3D-FEM necessary for building design based on the data stored in the memory and the storage unit 8. The calculation unit 4 is realized by executing a program (software) by a processor such as a CPU (Central Processing Unit) or a GPU (Graphics-Processing Unit). Some or all of these functional parts may be realized by hardware such as LSI (Large-Scale Integration), ASIC (Application-Specific Integrated Circuit), FPGA (Field-Programmable Gate Array), or may be realized by the collaboration of software and hardware.

The program may be stored in advance in a storage device such as an HDD (Hard Disk Drive) or a flash memory, or may be stored in a removable storage medium such as a DVD or a CD-ROM installed in the storage device by mounting the storage medium in the drive device. The program may be executed from an external server connected through a network.

The display unit 6 is, for example, a display device such as an LCD (Liquid Crystal Display), an organic EL (Electro Luminescence) display, or an LED (Light-Emitting Diode) display. The display unit 6 does not necessarily have to be provided in the design system 1, and may be realized by another terminal device such as a personal computer, a tablet terminal, or a smartphone connected to the design system 1 wirelessly or by wire.

Next, the specific processing contents of the calculation unit 4 will be described. The user inputs design data of a structure such as a building, which is a design object, via the input unit 2. The design data is stored in the storage unit 8.

Figure 2:
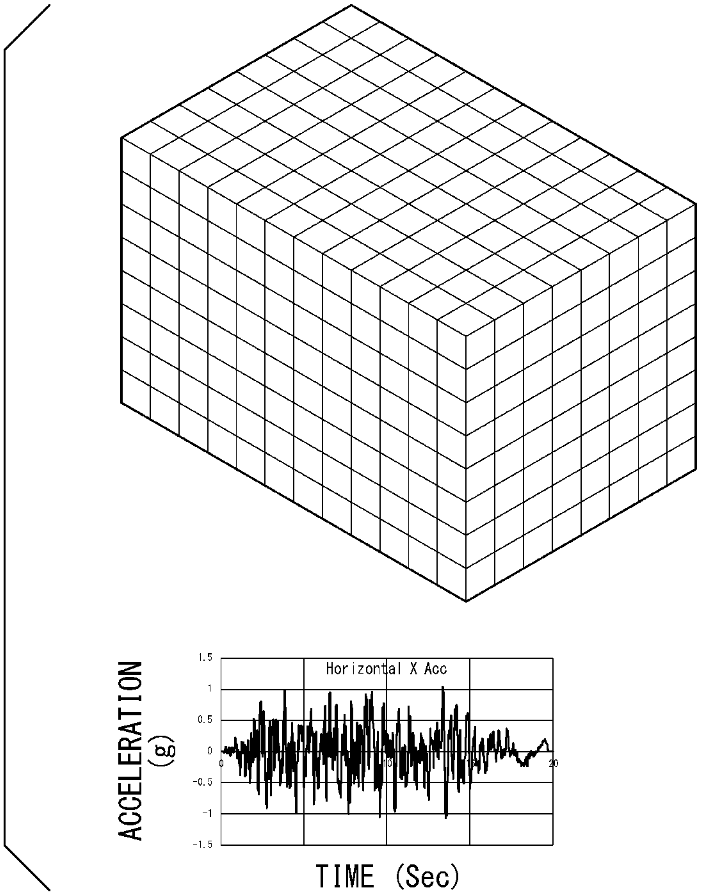
FIG. 2 is a perspective view showing a building modeled by a three-dimensional finite element method.

As shown in FIG. 2, the calculation unit 4 reads the design data from the storage unit 8 and generates a three-dimensional model of the building. The calculation unit 4 generates, for example, a three-dimensional model of a structure such as a reactor building based on design data.

The calculation unit 4 divides the structure into innumerable elements using a finite element method (FEM) model based on the design data, and calculates the stress component acting on each element. The calculation unit 4 performs elasto-plastic earthquake response analysis. The calculation unit 4 calculates, for example, dynamic stress components (first design stress) of n (n is a natural number) acting on the structure by earthquake input. The calculation unit 4 calculates the stress component (second design stress) acting on the structure due to the static load in addition to the time of the earthquake. The static load includes, for example, D: fixed load, L: load load, T: temperature load, S: snow load, W: wind pressure, H: earth pressure and water pressure, and the like.

The calculation unit 4 calculates the stress for the first design and the stress for the second design by combining them with a three-dimensional FEM response analysis model. The calculation unit 4 calculates the cross section of the structure using the calculated combined stress.

Figure 3:
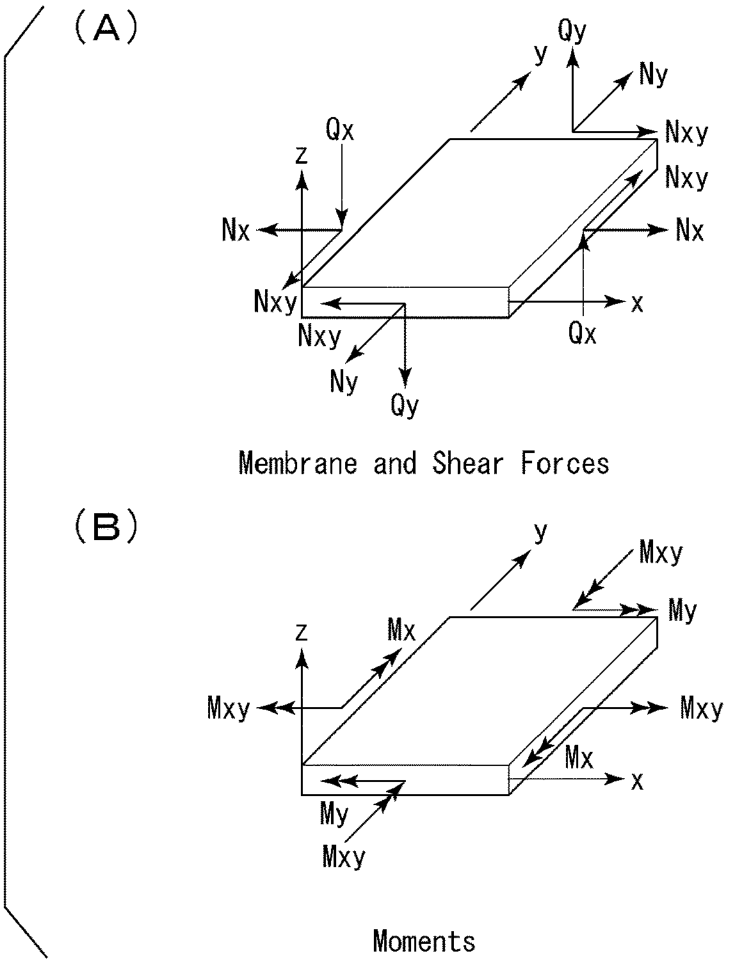
FIG. 3 is a diagram showing stress applied to an element of the finite element method.

As shown in FIG. 3, the calculation unit 4 calculates the stress acting on each element for each component based on the time history. Each element is divided into a shell element and a beam element according to the configuration of the part constituting the structure. The shell element is an element used for modeling a thin plate-shaped member composed of a continuum having a shape such as a plate or a shell. The shell element is composed of a surface having an apparently zero thickness, and has a rigidity corresponding to the plate thickness in calculation. The beam element is an element used for modeling a member having a rod-like shape composed of a continuum having a shape such as a beam. The beam element is composed of apparently line-only elements and has a calculated rigidity of a specified cross section.

The calculation unit 4 analyzes the member based on the shell element. The calculation unit 4 calculates stress time history data of eight components acting on the shell element. The calculation unit 4 analyzes, for example, a member based on a beam element. The calculation unit 4 calculates, for example, stress time history data of six components acting on the beam element.

In the cross-sectional design of the shell element, for example, the cross-sectional design is performed to calculate the balance between the film force (axial force) and the bending stress of six components (Nx, Ny, Nxy, Mx, My, Mxy). The earthquake response analysis will be described below.

The calculation unit 4 performs a three-dimensional analysis (earthquake response analysis) of the dynamic stress acting on the structure with respect to the earthquake input based on the design data. The calculation unit 4 outputs all the stress data acting within the predetermined time when the earthquake is input as stress time history data.

All stress time history data includes calculation results drawn in an n-dimensional space indicating the relationship between n stresses such as axial force, shear force, bending moment acting on walls, floors, or the like for calculating stress components, which become a huge amount of data. Therefore, the calculation unit 4 extracts the design stress used for the cross-sectional design from the enormous amount of stress time history data. The calculation unit 4 extracts stress data that is critical in cross-sectional design from a huge amount of stress time history data.

The calculation unit 4 sets, for example, a design stress space so as to enclose a region including a locus (history, time history) of a calculation result, which indicates a relationship between an axial force and a bending moment, in an outwardly convex shape (for example, a polygon), thereby calculating the design stress space as the design value. Specifically, the calculation unit 4 sets the design stress space so as to convexly envelop the region including the locus of the calculation result indicating the relationship between the axial force and the bending moment, thereby calculating the design stress space as the design value. Envelop in a convex shape means to cover the region including the locus of the calculation result drawn in the space with a figure so as not to have a dent. The calculation unit 4 sets a design stress space that is convexly enveloped with respect to the six components of the film force and the bending stress. Hereinafter, a two-dimensional region will be described as an example.

Figure 4:
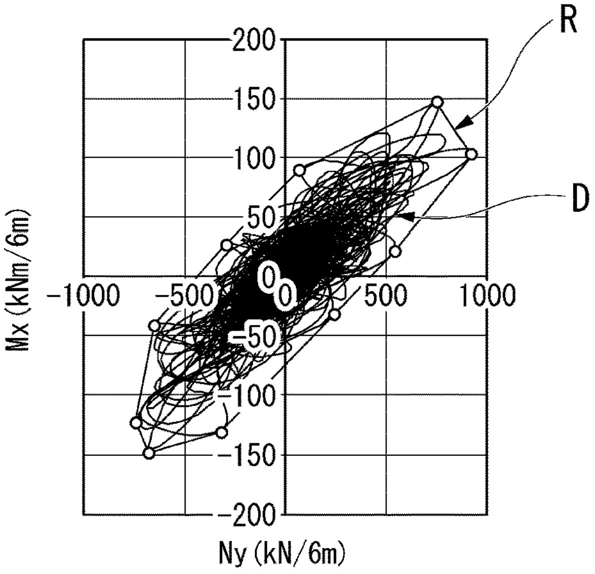
FIG. 4 is a diagram showing analysis results showing a relationship between an axial force and a bending moment by the finite element method.

As shown in FIG. 4, the calculation unit 4 extracts a region R that envelops all data in a convex shape from the locus indicating all the stress time history data D of the analysis result indicating the relationship between the axial force and the bending moment at a predetermined time. The algorithm that wraps around a convex shape is known as the Quickhull method.

Figure 5:
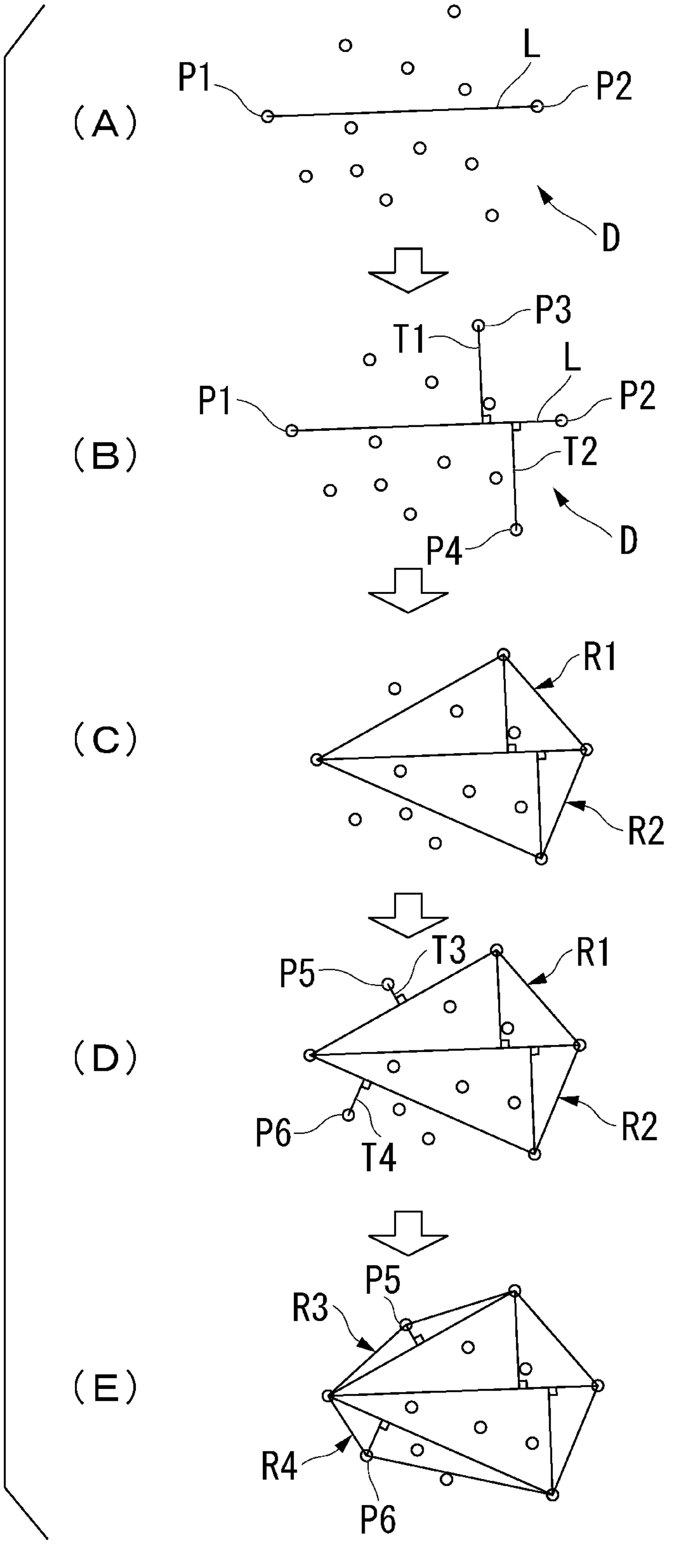
FIG. 5 is a diagram showing a method of enveloping a history of analysis results in a convex shape.

As shown in FIG. 5A, the calculation unit 4 obtains two points P1 and P2 having the maximum and minimum x coordinates from the stress time history data D, and draws a straight line L connecting the two points thereby dividing the region into two. Next, the calculation unit 4 extracts points P3 and P4 in which the lengths of the perpendiculars T1 and T2 with respect to the straight line are maximum in each region (see FIG. 5B). Next, the calculation unit 4 generates triangular regions R1 and R2 in which both ends of the straight line L are connected by a straight line from the extracted points P3 and P4 (see FIG. 5C).

The calculation unit 4 excludes the points (inner points and points on the edge) included in the triangular regions R1 and R2 from the processing, and extracts points P5 and P6 in which the lengths of the perpendiculars T3 and T4 are maximum with respect to the straight line newly connected to the points outside the triangular regions R1 and R2 (see FIG. 5D). If the points P5 and P6 cannot be extracted, the calculation unit 4 determines that all the analysis result data is enveloped in the quadrangular region formed by the triangular regions R1 and R2, and ends the process. Next, the calculation unit 4 generates triangular regions R3 and R4 from the extracted points P5 and P6 (see FIG. 5E).

The calculation unit 4 repeats the above processing, and ends the processing when there are no outer points. In the case of the two components of stress, all the analysis result data are enveloped in the region surrounded by the convex shape. The above process is extended to three or more stress components. The calculation unit 4 extracts data so as to wrap the locus of the calculation result drawn in the n-dimensional space in a convex shape. By the above processing, the data of the first design stress in which all the analysis result data are enveloped in the convex shape is extracted. The extracted first design stress data is a part of the analysis result, so it is not a conservative design.

Figure 6:
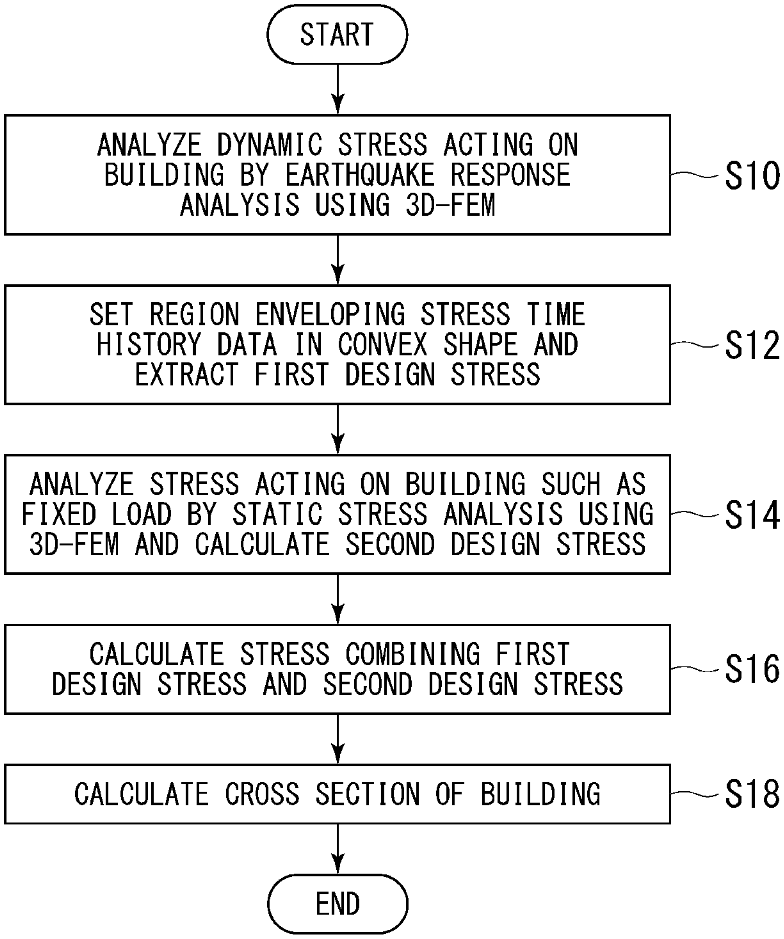
FIG. 6 is a flowchart showing a flow of processing executed in the design system.

FIG. 6 is a flowchart showing the processing flow of the design method executed in the design system 1. The calculation unit 4 constructs a 3D model of the building using 3D-FEM based on the design data input to the input unit 2, and calculates the stress acting on each element of the 3D model by earthquake response analysis, thereby analyzing the dynamic stress acting on the building (step S10). The calculation unit 4 sets a region enveloping all data in a convex shape from the locus indicating all the stress time history data of the analysis result of the stress acting on the building due to the earthquake input, thereby extracting the first design stress (step S12).

The calculation unit 4 analyzes the stress acting by a static load such as a fixed load using 3D-FEM based on the design data, and calculates the second design stress (step S14). The calculation unit 4 calculates a stress (combination stress) in which the first design stress and the second design stress are combined by a responsive model using 3D-FEM (step S16). The calculation unit 4 calculates the cross section of the building using the calculated combined stress (step S18).

As described above, according to the design system 1, while the total time history data calculated with a duration of 20 seconds/increment of 0.005 seconds is about 4000 pieces, by extracting the data by 6-dimensional enveloping by the above processing, the amount of data can be significantly reduced to about 700, which is about 1/6 of the total time history data.

Modification Example

The calculation unit 4 may set the design stress space by other processing. For example, the calculation unit 4 sets the design stress space so as to wrap the region including the locus of the calculation result indicating the relationship between the axial force and the bending moment in a hexagonal shape, thereby calculating the design stress space as the design value. Envelop in a hexagonal shape means to cover the region including the locus of the calculation result drawn in the space with a hexagonal figure. The calculation unit 4 sets a design stress space that envelops the six components of the film force and the bending stress in a hexagonal shape. Hereinafter, the relationship between the axial force and the bending moment will be described as an example.

Figure 7:
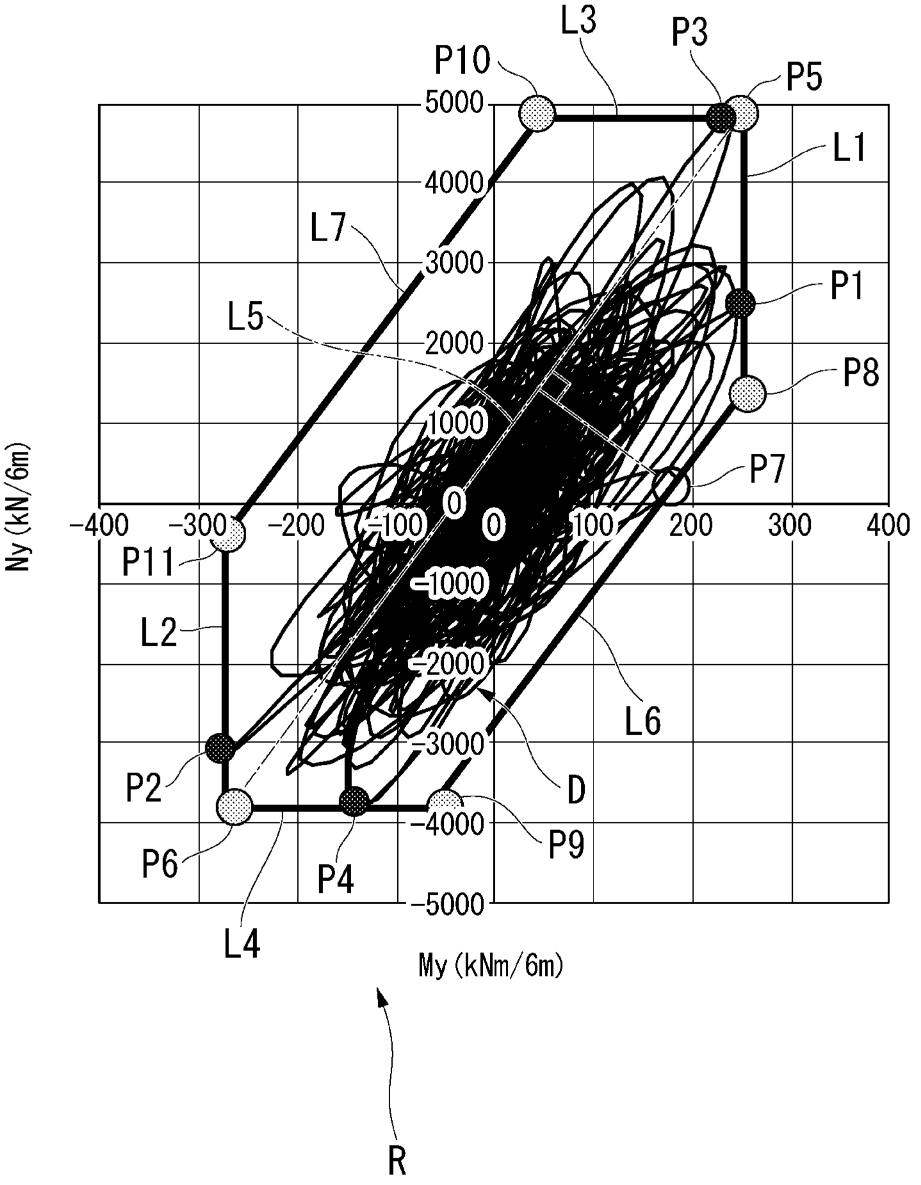
FIG. 7 is a diagram showing a method of enveloping the history of analysis results related to a modified example into a hexagonal shape.

As shown in FIG. 7, the calculation unit 4 extracts a region R that envelops all data in a hexagonal shape from the loci indicating all the stress time history data D of the analysis result indicating the relationship between the axial force and the bending moment at a predetermined time.

The calculation unit 4 obtains two points P1 and P2 having the maximum and minimum x-coordinates from the stress time history data D. The calculation unit 4 obtains two points P3 and P4 having the maximum and minimum y-coordinates from the stress time history data D. The calculation unit 4 obtains points P5 and P6 that are intersections of straight lines L1 and L2 that pass through points P1 and P2 and are parallel to the y-axis and straight lines L3 and L4 that pass through points P3 and P4 and are parallel to the x-axis. P5 and P6 are intersections of points P1 and P3, P2 and P4, respectively. The calculation unit 4 obtains a straight line L5 connecting P5 and P6.

The calculation unit 4 obtains a point P7 which is the farthest distance from the straight line L5. The calculation unit 4 obtains a straight line L6 that passes through the point P7 and is parallel to the straight line L5, and obtains L7 that is symmetric with respect to L6 with respect to the straight line L5. The calculation unit 4 obtains a point P8 at the intersection of the straight line L6 and the straight line L1 and a point P9 at the intersection of the straight line L6 and the straight line L4. The calculation unit 4 obtains a point P10 at the intersection of the straight line L7 and the straight line L3 and a point P11 at the intersection of the straight line L7 and the straight line L2. The calculation unit 4 is surrounded by points P5, P8, P9, P6, P10, and P11, and generates a hexagonal region R including all the stress time history data D.

In the case of two components of stress, all analysis result data is enveloped in the region surrounded by the hexagonal shape. The above process is applied to the axial force and bending moment in both x and y directions to generate a region R in each direction. The calculation unit 4 extracts points P5, P6, P8, P9, P10, and P11 as the first design stress. The calculation unit 4 calculates the cross section by combining the sign ± of the maximum absolute value of the in-plane shear force and the torsional moment with the above six points. Since the extracted data of the stress for the first design at the above 6 points are data other than the analysis result, the design is conservative.

Figure 8:
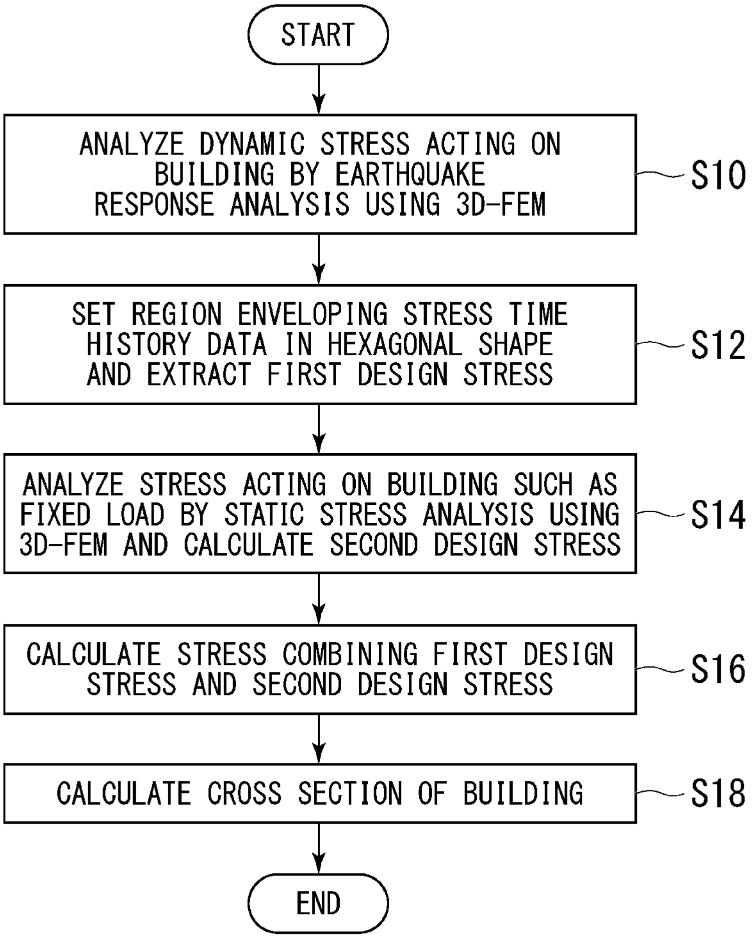
FIG. 8 is a flowchart showing a flow of processing executed in the design system according to the modified example.

FIG. 8 is a flowchart showing the processing flow of the design method executed in the design system 1. The calculation unit 4 constructs a 3D model of the building using 3D-FEM based on the design data input to the input unit 2, and calculates the stress acting on each element of the 3D model by the earthquake input, thereby analyzing the dynamic stress acting on the building (step S10). The calculation unit 4 sets a region that envelops all data in a hexagonal shape from the locus indicating all the stress time history data of the analysis result of the stress acting on the building due to the earthquake input, and extracts the apex of the region as the first design stress (step S12).

The calculation unit 4 analyzes the stress acting by the static load including the fixed load using 3D-FEM based on the design data, and calculates the second design stress (step S14). The calculation unit 4 calculates a stress (combination stress) in which the first design stress and the second design stress are combined by a responsive model using 3D-FEM (step S16). The calculation unit 4 calculates the cross section of the building using the calculated combined stress (step S18).

As described above, according to the design system 1, the amount of data can be significantly reduced by extracting all the time history data by hexagonal enveloping by the above processing.

Although the embodiments including the modifications of the present invention have been described above, the present invention is not limited to the above-mentioned embodiment and can be appropriately modified without departing from the spirit of the present invention. For example, the calculation unit 4 exemplifies the calculation of a locus indicating the relationship between the axial force and the bending moment regarding the relationship of the stress acting on the structure, but the present invention is not limited to this, and a locus indicating the relationship between the stresses of two or more components acting on the structure may be calculated. Therefore, although the calculation unit 4 exemplifies setting the region of the design stress space in the two-dimensional space, the design stress space may be a space of three or more dimensions. When the design stress space is three-dimensional or more, the calculation unit 4 may set the design stress space so as to envelop a region including a locus indicating a stress relationship of two or more components in a convex shape.

What is claimed is:

1. A design system that assists in a design of a structure of a reactor building using a three-dimensional finite element method, the design system comprising:
- a storage unit;
- an input unit comprising a keyboard, touch panel, or user interface device, the input unit configured to receive an input of design data related to a configuration of and loads acting on the reactor building and store the design data in the storage unit; and
- a calculation unit coupled to the storage unit and comprising a processor configured with a program to perform operations comprising:
  - retrieving the design data from the storage unit;
  - dividing the configuration of the reactor building structure in the design data into a plurality of finite elements;
  - performing a three-dimensional analysis of a component of a stress acting on the structure with respect to earthquake input based on the design data;
  - calculating, using the three-dimensional finite element method, the stress component acting on each element of the plurality of finite elements into which the reactor building structure is divided, the stress components based on a time history of the design data;
  - calculating stress time history data indicating a relationship between stresses of two or more components acting on the structure over the time history;
  - setting a design stress space so as to envelop a region containing a locus of a result of calculating the stress time history data over the time history using the Quickhull method, the locus indicating a relationship between an axial force and a bending moment, the design stress space set in a convex shape comprising a polygon that envelops the region containing the locus;
  - calculating a first design stress acting on a cross section of the structure based on the design stress space comprising dynamic stress components acting on the structure; and
  - extracting data of the first design stress in which all of the analysis result data are enveloped in the convex shape.

2. The design system according to claim 1, wherein the processor is configured with the program to perform operations further comprising: based on the design data, performing the three-dimensional analysis of the component of the stress acting on the structure with respect to a static load including a fixed load and calculates a second design stress acting on the cross section of the structure, and based on the first design stress and the second design stress, calculating a stress acting on the cross section of the structure.

3. A design method that assists in a design of a structure of a reactor building to be designed by using a three-dimensional finite element method, the design method comprising:
- receiving from an input unit comprising a keyboard, touch panel, or user interface device, an input of design data related to a configuration of and loads acting on the reactor building and storing the design data in a storage unit;
- retrieving the design data from the storage unit;
- dividing the configuration of the reactor building structure in the design data into a plurality of finite elements;
- performing three-dimensional analysis of a component of a stress acting on the structure with respect to earthquake input based on the design data;
- calculating, using the three-dimensional finite element method, the stress component acting on each element of the plurality of finite elements into which the reactor building structure is divided, the stress components based on a time history of the design data;
- calculating stress time history data indicating a relationship between stresses of two or more components acting on the structure over the time history;
- setting a design stress space so as to envelop a region containing a locus of a result of calculating the stress time history data over the time history using the Quickhull method, the locus indicating a relationship between an axial force and a bending moment, the design stress space set in a convex shape comprising a polygon that envelops the region containing the locus;

calculating a first design stress acting on a cross section of the structure based on the design stress space, the first design stress comprising dynamic stress components acting on the structure; and extracting data of the first design stress in which all of the analysis result data are enveloped in the convex shape.

* * * * *